(12) United States Patent
Råsånen (10) Patent No.: US 6,330,230 B1
(45) Date of Patent: Dec. 11, 2001

(54) DATA TRANSMISSION METHOD (75) Inventor: Timo Y. J. Råsånen, Jorvas (FI)

(73) Assignee: Nokia Telecommunications Oy (FI)

( * ) Notice: Subject to any disclaimer, the term of this patent is extended or adjusted under 35 U.S.C. 154(b) by 0 days.

(21) Appl. No.: 09/223,366

(22) Filed: Dec. 29, 1998

Related U.S. Application Data (63) Continuation of application No. PCT/FI97/00437, filed on Jul. 3, 1997.

(30) Foreign Application Priority Data

Jul. 5, 1996 (FI) ........................................................ 962767

(51) Int. Cl.$^7$ ........................................................ H04J 3/00
(52) U.S. Cl. ........................ 370/280; 370/521; 359/113; 359/140
(58) Field of Search ................................... 370/229, 235, 370/236, 464, 465, 498, 501, 516, 519, 521, 276, 280, 477; 359/113, 137, 140

(56) References Cited

U.S. PATENT DOCUMENTS 4,149,039 * 4/1979 Yuguchi et al. .................... 370/477

(List continued on next page.)

FOREIGN PATENT DOCUMENTS

| 0 426 961 | 5/1991 | (EP) . |
| 0 524 390 | 1/1993 | (EP) . |

OTHER PUBLICATIONS

William Stallings, *Data and Computer Communications*, 4th Edition, Ch. 5.1–5.2, 1994.
PCT International Search Report for International Application No. PCT/FI97/00437, Dec. 1997.

*Primary Examiner*—Chau Nguyen
*Assistant Examiner*—D. Trinh
(74) *Attorney, Agent, or Firm*—Altera Law Group (57) ABSTRACT

The invention concerns data transmission method for implementing a transmission connection. The transmission connection comprises a transfer media (11) and transceivers (A, B) located at opposite ends of the connection. In the method the transceivers operate in time domain in consecutive cycles (T) each of which is composed of the following parameters: (a) a transmission interval (Tr) whose length corresponds substantially to the length of the burst to be transmitted, (b) a switching interval (t1) during which the transceiver switches from transmission interval to reception interval, (c) a reception interval (Rc) whose length corresponds substantially to the length of the burst transmitted by another transceiver, and (d) a switching interval (t2) during which the transceiver switches from the reception interval to the transmission interval. The propagation time τ of the burst across the connection is determined before the transfer of payload data is started. To create an efficient transmission connection the parameters of the cycle (T) are selected so that they have the following relationship with the propagation time τ of the burst:

$$\tau = \{t1 + \frac{T1 + T2}{2} + n \times T, n = 0, 1, 2 \ldots$$

or $$\tau = \{\frac{t1 - t2}{2} + n \times T, n = 1, 2, \ldots$$

where T1 is the length of the burst in the first transmission direction and T2 the length of the burst in the second transmission direction, t1 is the switching time from transmission state to reception state, t2 is the switching time from reception state to transmission state, and T is the length of said cycle.

19 Claims, 5 Drawing Sheets

U.S. PATENT DOCUMENTS

| | | | | |
|---|---|---|---|---|
| 4,316,061 | * | 2/1982 | Ahamed | 370/521 |
| 5,715,074 | * | 2/1998 | Netsu | 359/110 |
| 5,898,666 | * | 4/1999 | Fukuda | 370/280 |
| 6,031,645 | * | 2/2000 | Ichikawa | 359/113 |

* cited by examiner

DATA TRANSMISSION METHOD

"This application is a continuation of international application number PCTFI97/00437, filed Jul. 3, 1997, pending."

FIELD OF THE INVENTION

The invention relates generally to implementation of a data transmission connection, and especially an optic transmission connection by using the TCM technique (Time Compression Multiplexing).

BACKGROUND OF THE INVENTION

Optical fiber is a self-evident choice as the transmission medium for a trunk network, because trunk connections usually need a high transmission capacity; the transmission distances used are long, and existing routes are often found for the cables. Even for subscriber connections (the line between the local exchange and the subscriber) the situation is rapidly changing, because various services implemented with multimedia and demanding a high transmission rate will soon be everyday services also from the viewpoint of the private consumer. Changing the subscriber network into an optical network is a technical-economical question involving a conflict between expenses, on the one hand, and the advantages achieved on the other. Purely from the technical point of view, it is obvious that the capacity of a metal pair cable is considerably less than the capacity of an optical fiber. This is obvious although nowadays efficient studies have begun to examine the possibility of using the ordinary subscriber line (metal pair cable) for high-speed data transmission. Such solutions are primarily the new HDSL, ADSL and VDSL technologies which offer new possibilities for transferring data and video via the pair cable of the telephone network to subscriber terminals.

Figure 1:
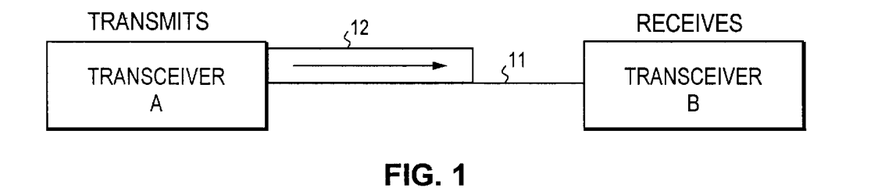
FIGS. 1 and 2 illustrate an ordinary TCM transmission connection.
Figure 2:
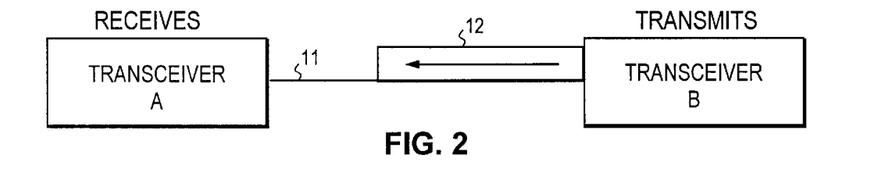

The international standardization organization ETSI (European Telecommunications Standards Institute) has defined the TCM technique as one of the transmission techniques to be used for narrow-band interactive services in an optic access network (the term access network refers to the part of the data transmission network which enables the users to access the services provided by the network). Current TCM systems operate so that the transceiver units alternate in transmitting bursts in the fiber or line. This principle is illustrated in FIGS. 1 and 2, which describe the connection at two different moments in time. The transceivers A and B send and receive alternatively; as one transmits, the other receives, and vice versa. Because of this the technique is referred to as "ping-pong". Therefore, there is only one burst 12 proceeding in the fiber or line 11.

Figure 3:
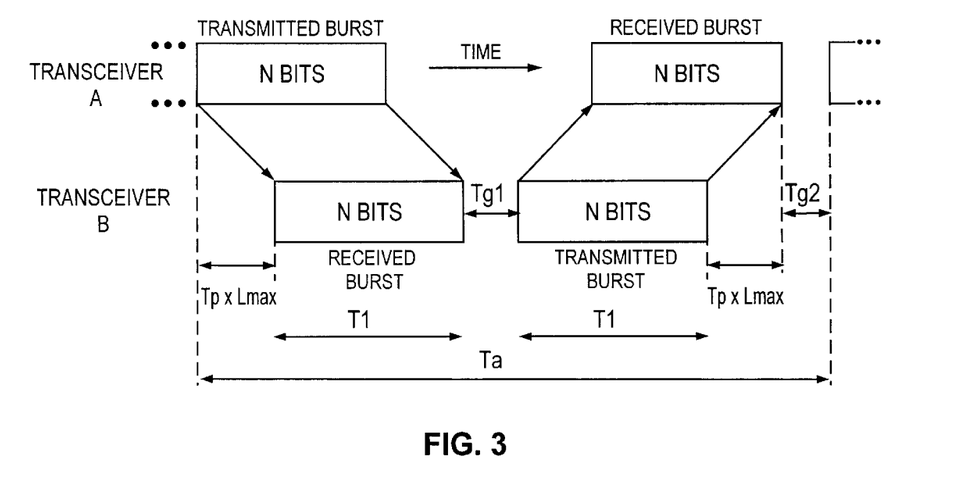
FIG. 3 illustrates the operation cycle of an ordinary TCM transmission connection.

FIG. 3 illustrates one operation cycle of this kind of system, the cycle being referred to with the reference symbol Ta. The length of the operational cycle is $2(Tp \times Lmax) + Tg1 + Tg2 + 2T1$, where Tp is the propagation velocity in the fiber ($\approx 4.85$ $\mu s$/km), Lmax is the maximum length of the connection, Tg1 and Tg2 are guard times between the bursts and T1 is the length of the burst (N bits). As the figure shows, a transceiver has, between the transmission and reception phases, a specific, mandatory waiting time. The longer it takes for data to cross the connection, the longer the waiting time.

A significant advantage in the principle described above is that the transceiver part can be implemented by using one transceiver component, for example, in the case of the optic transmission connection, by using an optic component which operates, alternatively, in transmission and reception states. This kind of a "one chip solution" offers significant savings, for example, when implementing optic subscriber connections.

The drawback of the method described above is mostly that the buffering time and delay increase as the length of the connection increases. If the length of the connection is, for example, 20 kilometers, the mere propagation time across the connection is approx. 0.1 ms, whereby a buffering capacity corresponding to a traffic amount of approximately 0.2 ms is needed. As the transmission rates increase, the buffers become longer and longer, whereby the implementation becomes more and more complicated.

The delay caused by buffering and by the waiting time required by such a ping-pong type protocol generates undesired effects as it cumulates with other delays generated in the network, e.g. echo effects in voice transfer. Furthermore, certain applications are such that they hardly tolerate any delay at all, e.g. remotely controlled applications in which, for example, different processes are controlled via the data transmission network. On a general level it can be stated that at least for real-time services it is always desirable to minimize the delay, as excessive delay makes the implementation of such services impossible.

SUMMARY OF THE INVENTION

The purpose of the present invention is to solve the drawbacks presented above by creating a solution with which it is possible to implement in a very simple manner a transmission method which ensures minimal delay and still enables the implementation of the transceiver part by using a single transceiver component.

This objective is achieved by using methods which are specified in the independent claims.

The idea of the invention is, first, to create for the burst sequence such parameters in the time domain that a burst can propagate along the fiber or line (essentially on the same frequency, i.e. on the same channel) efficiently in both directions at the same time and that both transceivers can still follow the transmission/reception alternation presented above. Further, the idea of the invention is also to adjust these parameters during the transmission connection so that, for example, the changes in the synchronization requirements caused by variations in the propagation time are taken into account. The aforementioned efficiency means that bursts shorter than the length of the connection are sent in the transfer medium (for example, fiber) by simultaneously maintaining continuous synchronization so that a burst transmitted by the opposite end arrives, in principle, immediately after the transceiver has shifted from the transmission state to the reception state after having transmitted a burst.

A protocol according to the invention can thereby extremely efficiently eliminate the delay typical of a ping-pong type protocol because of the alternative nature of the connection. A transceiver does not have to wait for the burst transmitted by the opposite end after having transmitted its burst, as the solution according to the invention ensures, in principle, as short a waiting time as possible by the component technology. In other words, this kind of waiting time can be made to correspond to the shortest time period during which it is possible to switch from the transmission state to the reception state or vice versa.

BRIEF DESCRIPTION OF THE DRAWINGS

In the following, the invention and its advantageous embodiments are described in closer detail with reference to examples shown in FIGS. 4 to 9 in the attached drawings, wherein.

DETAILED DESCRIPTION OF THE INVENTION

Figure 4:
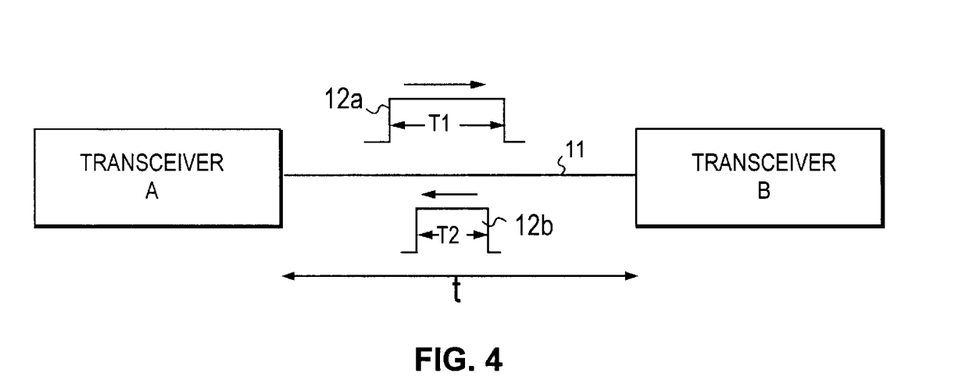
FIG. 4 shows a transmission connection according to the present invention on a general level.

FIG. 4 illustrates a transmission connection according to the present invention on a general level. The transmission connection is formed in a line or a fiber by a single channel via which data is transmitted in both directions. Transceiver A transmits the burst string 12a to transceiver B and the transceiver B transmits the burst string 12b to the transceiver A so that at each moment of time the channel typically contains one or more bursts propagating towards the opposite transceiver. The length of a single burst transmitted by the transceiver A is indicated in the figure by the reference symbol T1 and the length of a single burst transmitted by the transceiver B by the reference symbol T2. The propagation time of a burst across the connection is indicated by the reference symbol $\tau$.

Figure 5A:
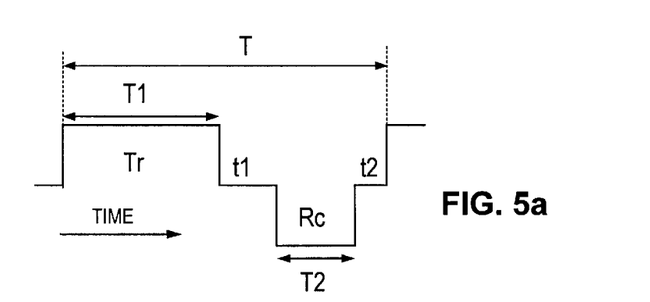
FIGS. 5a and 5b illustrate the operation of transceivers in a transmission connection according to the invention.
Figure 5B:
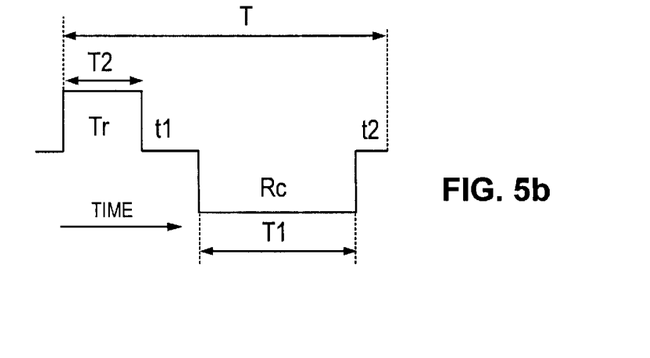

In order to be able to utilize the aforementioned "one chip solution" in the system, a single burst cycle of the transceiver A must comply with FIG. 5a and, correspondingly, a single burst cycle of the transceiver B must comply with FIG. 5b. The operation of each transceiver can be shown in the time domain so that the time axis is formed by consecutive burst cycles, each of which consists of certain time periods. The length of a burst cycle T of the transceivers can be expressed by using the equation (1) in the following manner:

$$T = \sum_{i=1}^{i=2} ti + \sum_{i=1}^{i=2} Ti \qquad (1)$$

where T1 is the length of a burst transmitted by the transceiver A, T2 is the length of a burst transmitted by the transceiver B, t1 is the switching time from the transmission state to the reception state, and t2 is the switching time from the reception state to the transmission state (typically, t1>t2). The transmission state whose length corresponds to the length of the transmitted burst is indicated by the reference symbol Tr and the reception state by the reference symbol Rc. From now on, the variables of equation (1) are referred to as burst parameters.

The example assumes that the transmission connection is asymmetric, in other words, that the burst lengths T1 and T2 differ in different directions. Thus the example is as general as possible and covers all possible alternatives.

Figure 6:
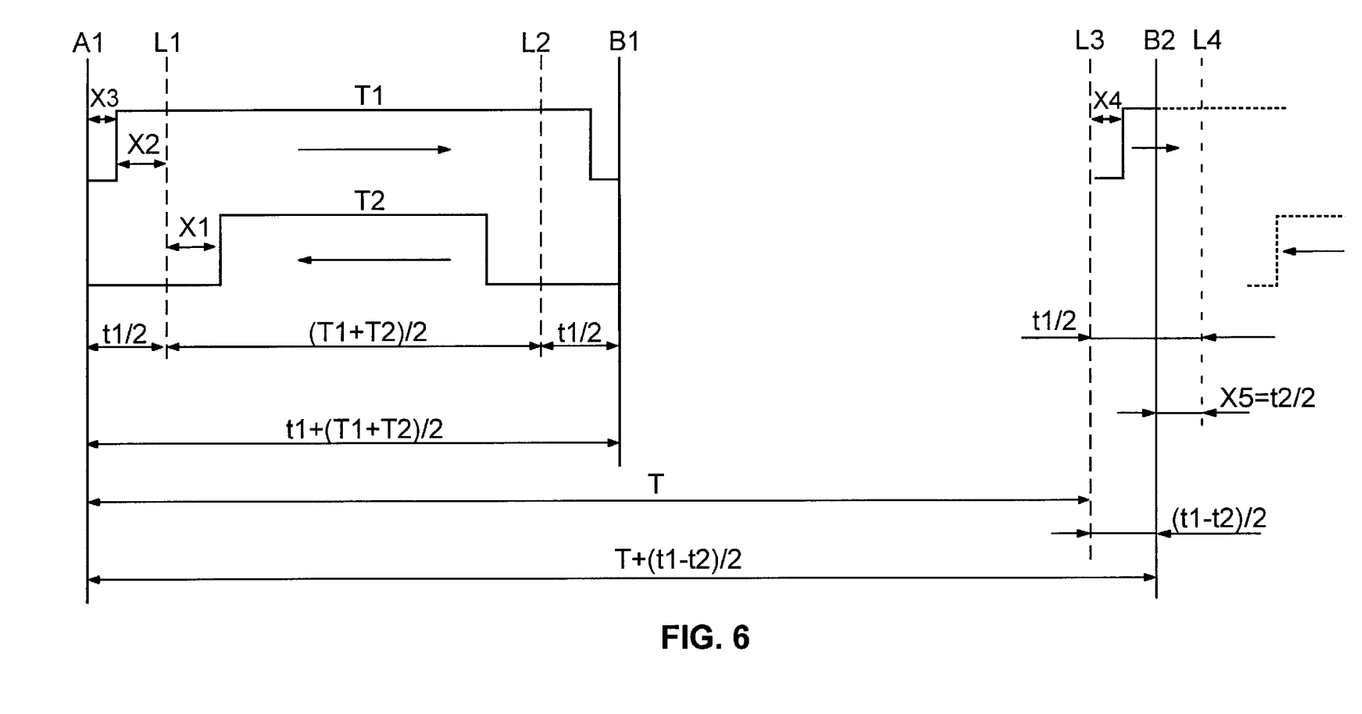
FIG. 6 shows a time diagram which illustrates the principle of a synchronized protocol according to the invention.

FIG. 6 illustrates the principle according to the invention by showing the bursts transmitted by transceivers A and B at a specific moment. The propagation directions of the bursts are indicated in the figure by arrows and if the situation is observed at the following moment, the burst T1 (the burst is referred to by using the same reference symbol as for its length) has moved slightly to the right and the burst T2 slightly to the left. The figure thereby shows, in a manner, which part of the transmission connection the burst fills at a specific moment. The distances are examined in the figure in the time domain, so that the distance between A and B corresponds to the propagation time of the burst through the connection.

In the first example, the transceiver A is at location A1 and the transceiver B at location B1. According to the invention, the bursts are transmitted "symmetrically" so that the midpoints of the bursts collide at the midpoint of the link. The length of the average of the bursts (T1+T2)/2 is indicated by dashed lines L1 and L2. Thus the distances indicated in the figure by reference symbols X1 and X2 are equal. From this, in turn, it follows that the distance between dashed line L1 and A1 must equal t1/2. This is due to the fact that the rear edge of the burst T1 and the front edge of the burst T2 meet at the dashed line L1 (because the distances X1 and X2 are equal), at which point the time which has elapsed from the moment that the transceiver A ceased to transmit is equal to the time that will elapse before the transceiver A starts to receive. The length of this time is t1/2, because the parameter t1 represents the switching time from the transmission state to the reception state (cf. FIGS. 5a and 5b). Correspondingly, the distance between the dashed line L2 and B1 is equal to t1/2.

On the basis of the above, the connection length $\tau$ between A1 and B1 can be calculated to be $\tau = t1+(T1+T2)/2$, which is the shortest connection length at which the protocol according to the invention functions. Because the transmission bursts arrive at intervals of the cycle T, the method according to the invention also functions for distances for which it is true that $\tau = t1+(T1+T2)/2+n \times T$ where n=0, 1, 2, . . .

In another example, the transceiver A is still at location A1, but the transceiver B has been moved to location B2, close to the distance that corresponds to the burst cycle T. The location which is at distance T from location A1 is indicated by the dashed line L3. At this location the situation is the same as at location A. In other words, for example, the rear edge of a burst that propagates to the right of the figure is in a position corresponding to location A1 (i.e. the distances X3 and X4 are equal). The dashed line L4 indicates the point at which the rear edge of a burst that propagates to the right of the figure meets the front edge of a burst that propagates to the left of the figure. As stated above, the distance from the location indicated by the dashed line L3 to this point is equal to t1/2. The distance (reference symbol X5) from the meeting point of burst edges (dashed line L4) to the location of the transceiver is equal to t2/2. The reason for this is that the rear edge of the burst T1 and the front edge of the burst T2 meet at the dashed line L4, at which point the time that has elapsed from the moment that the transceiver B ceased to receive is equal to the time that will still elapse before the transceiver B starts to transmit. The length of this time is equal to t2/2 because the parameter t2 represents the switching time from the reception state to the transmission state (cf. FIGS. 5a and 5b). Thus it can be calculated that the distance between the location B2 and the dashed line L3 equals (t1−t2)/2, and the distance between the transceivers equals T+(t1−t2)/2.

As a summary of the above, it can be stated that according to the invention the propagation time $\tau$ across the connection (length of the connection) and the burst cycle parameters correlate with one another in two alternate ways according to equation (2) below.

$$\tau = \begin{cases} t1 + \dfrac{T1 + T2}{2} + n \times T, n = 0, 1, 2 \ldots \\ \dfrac{t1 - t2}{2} + n \times T, n = 1, 2, \ldots \end{cases} \quad (2)$$

The upper part of the equation describes a situation in which the connection is, at the minimum (n=0), only long enough to accommodate approximately half a burst cycle. Because of this the first alternative of the method is called in this connection the "half burst protocol." The lower part of the equation, on the other hand, describes a situation in which the connection is, at the minimum (n=1), long enough to accommodate approximately an entire burst cycle, which is why this protocol is called the "full burst protocol." In this context the term protocol means that the transmission connection is implemented so that the relationship shown in equation (2) is valid all the time.

Figure 7A:
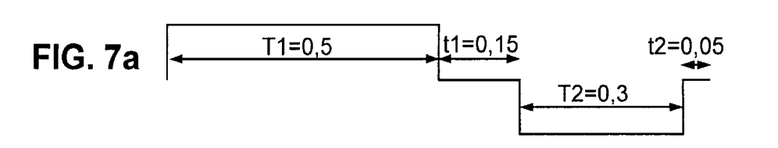
FIGS. 7a and 7b illustrate an example of the burst cycle of the transceivers.
Figure 7B:
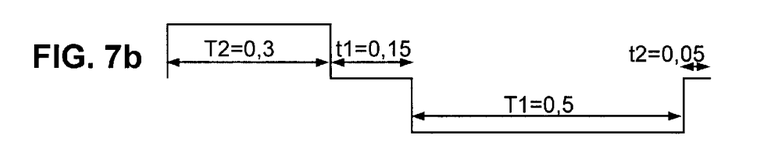

FIGS. 7a and 7b illustrate the above principle in an exemplary situation in which the burst parameters of the transceivers have the following values: T1=0.5, T2=0.3, t1=0.15, t2=0.05 (i.e. one burst cycle is equal to the time unit: T=1). When these parameter values are used, the burst cycle of the transceiver A corresponds to that shown in FIG. 7a and the burst cycle of the transceiver B to that shown in FIG. 7b. Temporally, these burst cycles correlate naturally to one another so that a reception cycle of a transceiver begins and ends according to how the burst transmitted by the opposite end begins and ends at the receiving end (after the propagation time delay).

Figure 7C:
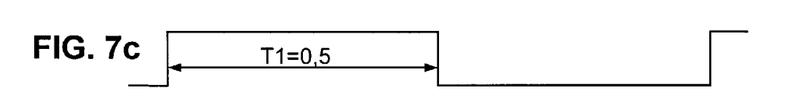
FIGS. 7c and 7d show the burst strings that correspond to FIGS. 7a and 7b, FIGS. 8a to 8n illustrate the location of bursts at different moments of time when the connection operates in a manner according to the invention.
Figure 7D:
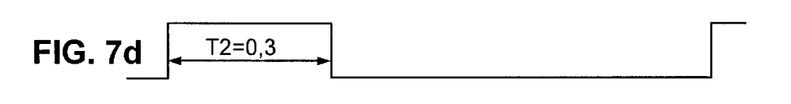

FIG. 7c shows the burst string transmitted by the transceiver A and FIG. 7b the burst string transmitted by the transceiver B. By calculating the propagation time $\tau$ according to the upper alternative of equation (2) and by using the aforementioned values, the propagation time $\tau$=0.55, when n=0.

Figure 8A:
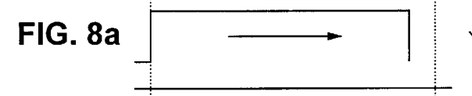
Figure 8B:
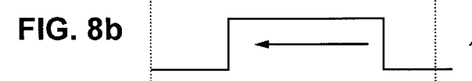
Figure 8C:
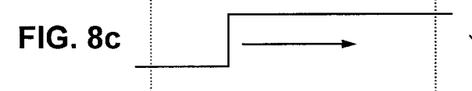
Figure 8D:
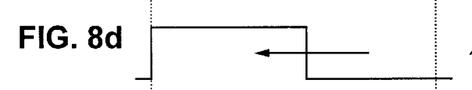
Figure 8E:
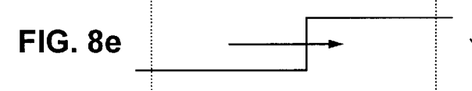
Figure 8F:
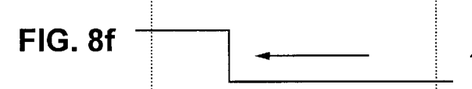
Figure 8G:
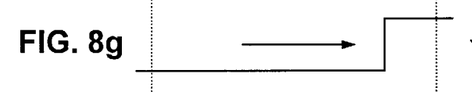
Figure 8H:
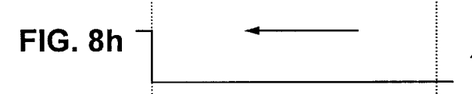
Figure 8I:
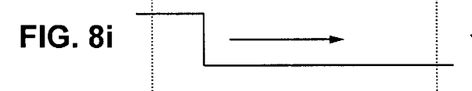
Figure 8J:
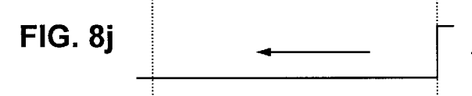
Figure 8K:
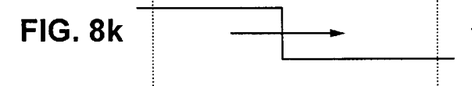
Figure 8L:
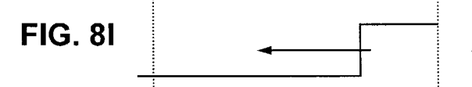
Figure 8M:
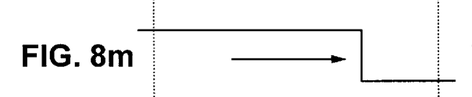
Figure 8N:
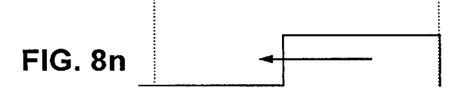

FIGS. 8a to 8n show a situation in which the propagation time between the transceivers $\tau$=0.55. The figures show the situation of the link at seven different moments in time so that FIGS. 8a and 8b show the situation at the moment t=0, FIGS. 8c and 8d the situation at the moment t=0.15, FIGS. 8e and 8f the situation at the moment t=0.30, FIGS. 8g and 8h the situation at the moment t=0.45, FIGS. 8i and 8j the situation at the moment t=0.60, FIGS. 8k and 8l the situation at the moment t=0.75, and FIGS. 8m and 8n the situation at the moment t=0.90. The starting moment (t=0) is determined as the moment at which the transmission burst of the transceiver A ends. By following the situation in these figures, it can be observed that the transceiver A operates according to FIG. 7a and the transceiver B according to FIG. 7b.

If the minimum length corresponding to the "full burst protocol" (the lower part of equation (2)) is calculated according to the aforementioned values, equation (2) gives the value $\tau$=1.05 for the propagation time. If, instead, the value of n=1 is selected for the variable n, for example, in the upper part of equation (2), the value of the propagation time comes out as $\tau$=1.55 or if, for example, in the lower part of the equation the value of n=2 is selected for the variable n, the value of the propagation time comes out as $\tau$=2.05. Thus, the value of the variable n determines, in part, the final relation between the propagation time (the length of the connection) and the length of the burst cycle. In some situations it is possible, as described later, to use the parameter n as a parameter that adjusts the properties of the burst cycle in a manner similar to which the aforementioned burst parameters are used. Because of this it must be understood that n also belongs to the burst parameters.

In the initialization phase of the connection the transceiver can measure the propagation time of a burst and select the protocol to be used according to the measured propagation time value (in other words, decide whether the transmission connection will follow the lower or upper alternative of equation (2)).

The above describes the conditions to be fulfilled by the burst parameters and the propagation time in order to create a synchronous transmission connection according to the invention. Because in practice the propagation time has a certain initial value, the burst parameters are calculated according to this initial value so that equation (2) is true. During the transmission the burst parameters are adjusted so that the equation remains valid, for example, according to the changes in the length of the fiber caused by temperature fluctuations. The following describes in more detail the establishment and maintenance of a transmission connection considered from the point of view of the invention.

In the initialization phase of the connection the transceivers detect the existence of the opposite transceiver, measure the length of the connection, select the protocol to be used for the connection on the basis of the measurement result, and adjust the burst parameters to the desired values. The protocol to be used can also be selected in advance, in which case the only thing that is carried out during the selection phase is the enablement of the protocol that is integrally configured in the device.

After the start-up, the transceivers can be, for example, in a special initialization state in which they transmit short initialization bursts to one another every now and then and switch, right after the transmission, to the reception state. After having received the initialization burst from the opposite end, the transceiver, after a certain constant delay, transmits a burst and switches immediately after that to the reception state to wait for a new burst. In this manner the transceiver can, by measuring the time between the received initialization bursts, determine the propagation time $\tau$. The time TA between the received bursts is given by TA=2×($\tau$+$\Delta$t), where $\Delta$t is the aforementioned constant delay so the propagation time $\tau$ is given by $\tau$=(TA/2)−$\Delta$t.

On the basis of the measured propagation time $\tau$, the configuration logic of the transceiver selects the burst parameters according to equation (2). The first selection can relate to whether the "protocol" to be used will be the upper or lower alternative of equation (2). This selection can also be fixed in advance so that only one of the protocols can be selected. Next the configuration logic can select the value for the parameter n. The value of the parameter n can also be fixed in advance, for example, so that in the upper alternative of equation (2) only the value n=1 is possible and in the lower alternative, only the value n=0.

The configuration logic of the transceiver thereby determines the length T of a burst cycle and the other aforementioned burst parameters. In other words, the configuration logic calculates, among other things, the bit rate and the number of bits in bursts of different directions.

After having decided on the parameter values the transceivers fetch the mutual phase synchronization in a known manner, for example, so that one transceiver only listens and tunes itself into phase synchronization according to the burst sent by the opposite end. After this, the transfer of payload data can start by using the calculated parameters.

During the transfer of payload data (i.e. in the continuous phase of the connection), the transceiver measures the changes in the propagation time τ. This can be implemented, for example, by monitoring the phase difference between the outgoing and incoming burst. A transmission burst includes a preamble part that contains, among other things, a frame synchronization word. One of the bits of the preamble part has been set as the reference bit in relation to the propagation time by which the phase differences between the transmitted and received frames are compared. On the basis of the detected changes (which are proportional to changes in propagation time), the burst parameters are adjusted so that the selected relationship according to equation (2) remains in effect. The adjustment can be implemented, for example, by adapting the lengths of the transmission bursts. This, in turn, can be implemented by adjusting the length of a bit sequence or the number of bits in a burst.

During the transfer of payload data, it is also possible to operate either (a) so that the value of the parameter n is changed to another in the selected relationship according to equation (2), or (b) so that the system shifts to use another protocol (i.e. the upper relationship of equation (2) is changed to the lower or vice versa). Such changes may be necessary for the reason that the properties of the transmission connection, such as the transmission rates of the traffic sources used, change significantly during the continuous state of the connection.

Figure 9:
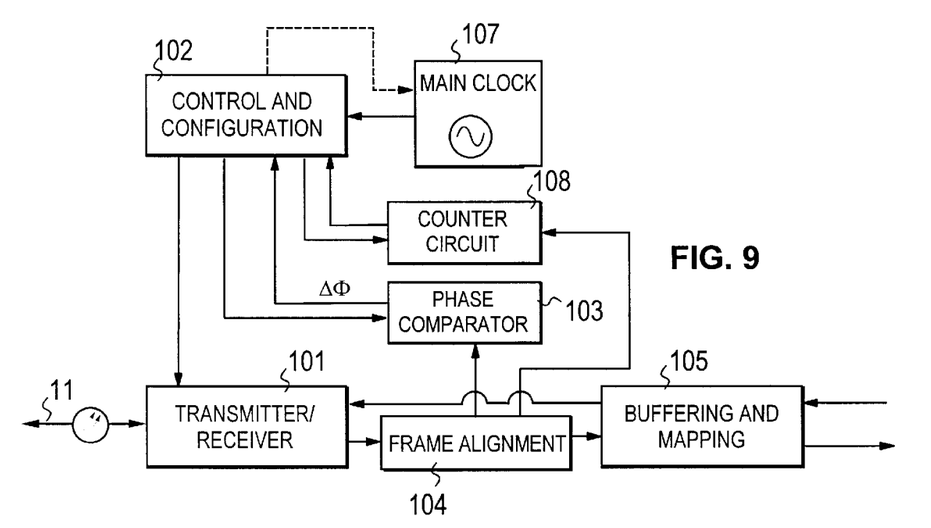
FIG. 9 shows a functional block diagram of the transceiver equipment.

FIG. 9 is a functional block diagram that illustrates transceiver equipment which is connected to the optic fiber 11 and operates according to the principle described above. The transceiver part that contains the actual optical transmitter and receiver part and the optoelectric transformer is indicated by the reference number 101. The transceiver part is controlled by the control and configuration unit 102, which determines, for example, the transmission/reception alternation of the transceiver unit according to the selected burst lengths.

In the initialization phase of the connection, the propagation time τ can be measured, for example, by using the counter circuit 108. The control and configuration unit 102 starts the counter after having given the transmission command to the transceiver part, and the frame alignment circuit 104 gives the counter a stop pulse when it detects the answer burst from the transceiver located at the opposite end of the connection. The frame alignment circuit can include, for example, an ordinary edge detection circuit which detects the front edge of the burst, or it can contain a correlator that gives the stop pulse when it detects a predefined bit pattern (which is included in the preamble part of the burst) in its input. The control and configuration unit 102 determines the propagation time according to the counter value and performs the definitions described above on the basis of this value.

In the continuous state of the transmission connection the phase comparator compares the phase difference between the transmitted frame and the received frame by using the aforementioned reference bit, and the control and configuration unit 102 monitors the phase difference data ΔΦ supplied by the phase comparator 103. The data about the phase of the received frame is received from the frame alignment circuit in the reception branch. The control and configuration unit adjusts the burst parameters on the basis of changes in the propagation time. This can be effected, for example, by adjusting the frequency of the main clock 107 of the transceiver. The frequency adjustment of the main clock can be used to change, for example, the length of the bit sequence.

Additionally, FIG. 9 shows the buffering and mapping unit 105. This unit performs in the transmission direction the buffering of data into the burst memory from which the transmitter part reads the data and transmits it further to the connection 11. In the reception direction the buffering and mapping unit 105 performs the mapping of data received from the connection 11 in the transmission frame of the outgoing signal.

The method described above can also be applied in point-to-multipoint connections and/or in multichannel transmission. Point-to-multipoint connections can be implemented by applying the protocol described above to the maximum propagation time of the network (the propagation time from the head-end unit to the optical network unit located farthest away) and by performing electronic delaying in other network units, by means of which other network units (located nearer) are adjusted to the maximum propagation time. Multichannel transmission can be implemented by dividing a burst into parts, each of which is intended for a different network unit. In the downlink direction each network unit receives its own part of the burst and in the uplink direction network units phased in relation to one another add their part at the right point of the burst.

The method can also be applied to Wavelength Division Multiplexing (WDM) systems. In this manner it is possible to implement several parallel connections (point-to-point or point-to-multipoint) in one fiber.

Even though the invention is described above by referring to examples according to the attached drawings, it is clear that the invention is not limited to situations described in these examples, but it can be varied within the idea of the invention described above and in the attached claims. Even though, for example, the principle according to the invention has been described above by using an optical transmission connection, it must be noted that the protocol according to the invention is suitable also for other transfer media. For propagation time measurement it must also be noted that in principle it is possible, if the connection length is known precisely, to preset the initial value of the propagation time in the transceiver, in which case there is no need to measure it separately during the initialization phase. In the continuous phase (during the transfer of payload data), it is not absolutely necessary to perform the adjustment of the parameters either, but depending on the application, it may be enough that the parameters are assigned specific initial values which are maintained throughout the entire connection.

What is claimed is:

1. A data transmission method for a bidirectional transmission connection, the transmission connection comprising a transfer medium and transceivers located at opposite ends of the medium, the method comprising the steps of using the transceivers in time domain in consecutive cycles, each cycle being composed of the following parameters:
(a) a transmission interval whose length corresponds substantially to the length of the burst to be transmitted,
(b) a switching interval during which the transceiver switches from the transmission interval to reception interval,
(c) a reception interval whose length corresponds substantially to the length of the burst transmitted by another transceiver, and
(d) a switching interval during which the transceiver switches from the reception interval to the transmission interval, determining the propagation time τ of the burst across the transmission connection before transmission of payload data is started, and selecting the parameters of the cycle so that they have the following relationship with the propagation time τ of the burst:

$$\tau = \left\{ t1 + \frac{T1 + T2}{2} + n \times T \right.$$

where T1 is the length of the burst in the first transmission direction and T2 is the length of the burst in the second transmission direction, t1 is the switching time from transmission state to reception state, T is the length of said cycle, and n is a number from the set {0, 1, 2 . . . }.

2. A method according to claim 1, wherein the propagation time of the burst is determined by a measurement performed by the transceivers.

3. A method according to claim 2, wherein the value of the parameter n is changed during the transfer of payload data.

4. A method according to claim 1, further comprising the steps of monitoring the changes in the propagation time during the transfer of payload data and adjusting the parameters of the cycle according to the changes in the propagation time so that the relationship between the propagation time and the parameters is maintained.

5. A method according to claim 4, wherein the value of the parameter n is changed during the transfer of payload data.

6. A method according to claim 1, wherein the value of the parameter n is changed during the transfer of payload data.

7. A data transmission method for a bidirectional transmission connection, the transmission connection comprising a transfer medium and transceivers located at opposite ends of the medium, the method comprising the steps of using the transceivers in time domain in consecutive cycles, each cycle being composed of the following parameters:

(a) a transmission interval whose length corresponds substantially to the length of the burst to be transmitted, (b) a switching interval during which the transceiver switches from the transmission interval to reception interval, (c) a reception interval whose length corresponds substantially to the length of the burst transmitted by another transceiver, and (d) a switching interval during which the transceiver switches from the reception interval to the transmission interval, determining the propagation time τ of the burst across the transmission connection before transmission of payload data is started, and selecting the parameters of the cycle so that they have the following relationship with the propagation time τ of the burst:

$$\tau = \left\{ \frac{t1 - t2}{2} + n \times T \right.$$

where t1 is the switching time from transmission state to reception state, t2 is the switching time from the reception state to the transmission state, T is the length of said cycle, and n is a number from the set {1, 2, 3 . . . }.

8. A method according to claim 7, wherein the propagation time of the burst is determined by a measurement performed by the transceivers.

9. A method according to claim 8, wherein the value of the parameter n is changed during the transfer of payload data.

10. A method according to claim 7, further comprising the steps of monitoring the changes in the propagation time during the transfer of payload data and adjusting the parameters of the cycle according to the changes in the propagation time so that the relationship between the propagation time and the parameters is maintained.

11. A method according to claim 10, wherein the value of the parameter n is changed during the transfer of payload data.

12. A method according to claim 7, wherein the value of the parameter n is changed during the transfer of payload data.

13. A data transmission method for a bidirectional transmission connection, the transmission connection comprising a transfer medium and transceivers located at opposite ends of the medium, the method comprising the steps of using the transceivers in time domain in consecutive cycles, each cycle being composed of the following parameters:

(a) a transmission interval whose length corresponds substantially to the length of the burst to be transmitted, (b) a switching interval during which the transceiver switches from the transmission interval to reception interval, (c) a reception interval whose length corresponds substantially to the length of the burst transmitted by another transceiver, and (d) a switching interval during which the transceiver switches from the reception interval to the transmission interval, determining the propagation time τ of the burst across the transmission connection before transmission of payload data is started, selecting one of the following two relationships as the relationship between the parameters of the cycle and the propagation time τ

$$\tau = \begin{cases} t1 + \dfrac{T1 + T2}{2} + n1 \times T \\ \dfrac{t1 - t2}{2} + n2 \times T \end{cases}$$

where T1 is the length of the burst in the first transmission direction and T2 the length of the burst in the second transmission direction, t1 is the switching time from transmission state to reception state, t2 is the switching time from the reception state to the transmission state, T is the length of said cycle, and n1 is a number from the set {0, 1, 2 . . . } and n2 is a number from the set {1, 2, 3 . . . }, and selecting the parameters of the cycle so that the selected relationship is fulfilled.

14. A method according to claim 13, wherein the propagation time of the burst is determined by a measurement performed by the transceivers.

15. A method according to claim 14, wherein the value of the parameter n1 or n2 is changed during the transfer of payload data.

16. A method according to claim 13, further comprising the steps of
- monitoring the changes in the propagation time during the transfer of payload data and
- adjusting the parameters of the cycle according to the changes in the propagation time so that the relationship between the propagation time and the parameters is maintained.

17. A method according to claim 16, wherein the value of the parameter n1 or n2 is changed during the transfer of payload data.

18. A method according to claim 13, wherein the value of the parameter n1 or n2 is changed during the transfer of payload data.

19. A method according to claim 13, wherein said relationship is changed during the transfer of payload data, whereby the parameters of the cycle are redefined according to the new relationship.

* * * * *